3,284,228
METHOD OF RENDERING POLYOLEFINE SURFACES NON-ADHERENT

Karl-Erik Ekstrom and Thorsten Lennartson Lindh, Lund, Sweden, assignors to AB Tetra Pak, Lund, Sweden, a Swedish company
No Drawing. Filed Feb. 11, 1963, Ser. No. 257,761
Claims priority, application Sweden, Feb. 14, 1962, 1,603/62
2 Claims. (Cl. 117—65.2)

The present invention relates to a method of anti-hot-tack non-hot-offset treating a polyolefine surface of packaging materials for the like the polyolefine surface of which, during any stage of conversion, is partially or totally to engage, by considerable pressure, a working surface heated to a temperature within or exceeding the melting range of the polyolefine surface, and subsequently to disengage said working surface.

Within the packaging industry the polyolefine plastics have found an increasingly wider application both alone in the form of films or extruded tubing and in combination with other sheet materials in the form of layers coated thereon or laminated thereto. In the latter case, hitherto they have usually formed that surface of the packaging material which in the finished package faces the commodity packaged and by means of which the package in question is sealed closed. Thereby the barrier and sealing properties of the polyolefine material have been utilized in the most favourable way as well.

Particularly in case of packaging materials such as paper one desideratum, however, is that the surface to form the outside surface of the finished package be stain and moisture repellent as far as possible. A package that is not sufficiently damp and moisture resistant does not offer any adequate protection for the commodity packaged, and, furthermore, it is likely to lose its shape. In addition, the package outside should constitute a selling eye-catcher and, therefore, is subject to particular requirements as regards its printability and its ability to display the printed design and/or lettering.

Also in these respects mentioned the packaging industry has recognized the possibilities of the polyolefine materials and has made use of them as coating or laminating layers on that surface of the packaging material to form the outside surface of the package intended. Thus, there are now available a great many packaging sheet materials where at least the face corresponding to the package outside surface comprises a polyolefine material. Examples of sheet materials of this kind are in the first place, of course, films wholly comprised of polyolefine material but also sheets of other plastic materials, paper, metal or viscose films or combinations thereof and having a polyolefine material at least on one face, viz. the face to form the outside face in the finished package.

In spite of the indisputable advantages offered by a polyolefine outside surface of a packaging material as regards appearance qualities and protection properties there are in certain cases such drawbacks inherent in the polyolefine outside surface as to limit considerably the applicability of the packaging material in question.

When converting the packaging materials discussed above from web or sheet shape into the finished package shape, in most cases use will be made of operations tending to cause at least a portion of the polyolefine surface of the packaging material to engage a heated working surface and subsequently to disengage said working surface. In such a process the temperature of the working surface may lie within or exceed the melting range of the polyolefine material in question, which will inevitably result in a damaging sticking of the polyolefine surface to the heated working surface and even in an offsetting of molten polyolefine material thereon, all of which is detrimental to the conversion process as a whole and thus to the finished package.

In order to eliminate these disadvantages of the packaging material having a polyolefine face and thereby to increase the versatility thereof this invention provides the measure of applying to the polyolefine surface, before engaging the heated working surface and at least along its corresponding zone or zones of engagement, a layer at least mainly comprising a petroleum paraffin, the thickness of said layer being so adjusted relative to the said engaging pressure, the working surface temperature and the engagement time so as to prevent the sticking of the polyolefine surface to the working surface which is detrimental to the conversion process and involves offsetting of polyolefine material onto said working surface.

The invention also relates to a packaging material of the kind in question, the polyolefine surface of which has been treated in the just-mentioned way, thus having, along that zone or zones which upon converting the packaging material are caused to engage a working surface heated to a temperature at least within the melting range of the polyolefine material under considerable pressure, a layer at least mainly comprising a petroleum paraffin.

In the following the invention will be illustrated with reference to a packaging process that has gained an increasingly wider acceptance. Said process comprises successively forming of a packing web material into a downwardly directed tube, the two longitudinal web edges being successively joined into either a helical longitudinal tube seam or a seam parallel to the tube axis.

The web material face corresponding to the tube inside surface has a surface of a heat-sealable plastic, e.g., polyethylene, and the tube is sub-divided into sealed packages by one or more pairs of co-operating clamping jaws flat-pressing it in zones transverse to the tube axis and spaced therealong at intervals corresponding to the package length, and, from the outside, supplying sealing heat to the inside plastic layer of the zone. The commodity to be packaged is supplied into the interior of the tube through the upper end thereof. The supply may be either continuous or intermittent, the first mentioned case inevitably implying that the sub-dividing sealing of the tube must be effected in the presence of commodity in the sealing zone. The individual filled and sealed packages are severable from each other by transverse cuts in the sealing zones.

The sealing heat in this instance being assumed to be supplied by conduction from the outside to the inside of the tube, the heat supply working surface of the respective clamping jaw pair will, of course, have to be at a temperature exceeding the melting range of the inner plastic surface.

According to the invention the packaging material in question on the side thereof facing outwards of the tube, has a fully covering polyolefine surface which, in case of a packaging material having a body of fibrous material such as paper between said surface and the inside plastic surface, has a moisture protecting function in the finished package, and in addition also lends an esthetically more attractive exterior thereto, which latter function, of course, will be the dominating one in the case of packaging material bodies of non-fibrous materials.

In the packaging process described, the outer polyolefine surface of the tube, when flat-pressing and heat-sealing the tube by the clamping jaws is subjected to a considerable contact pressure and also to a temperature exceeding the melting range of the polyolefine material in the zone of engagement of the heated working surface of the clamping jaw pair and the polyolefine surface. An inevitable result thereof will be that the outer polyolefine surface will stick to and deposit polyolefine material on the heated clamping jaw surface, and hence jeopardize the entire sealing operation.

Therefore, in accordance with the invention, to the polyolefine surface forming the outside of the tube there is, before engaging the heated working surface, and at least along the corresponding contact zones, applied a film mainly of petroleum paraffin, i.e. a material blendable with and closely related to polyolefine yet having a lower melting range.

The application of the paraffin layer may be carried out either in direct connection with the packaging operation proper or when producing the packaging material. In the first mentioned case the application may be effected in timed relationship to the sealing movement of the clamping jaws and onto the packaging web material, e.g. in a printing technique, where a roller or a stamp transfers molten paraffin to the polyolefine surface in question, the paraffin subsequently being allowed to solidify before engaging the heated clamping jaw surface. In the latter case the same or a similar technique may be applied when manufacturing or preparing the packaging web material. In both cases, for practical reasons, it may be advantageous to apply the paraffin in a continuous layer, but application in zones is equally possible as will be appreciated.

For reasons to be further discussed below the molten paraffin when applied should have a temperature substantially in the vicinity of the melting point or range of the polyolefine material of the substratum film. Therefore, in the paraffin coating method discussed a higher paraffin temperature is resorted to than in normal paraffining. Generally, the temperature difference in that respect will be in the order of say 20° C.

Since the working surface of the sealing jaw has a temperature exceeding the melting range of the polyolefine surface to which the paraffin has been applied, said melting range being higher than the melting point or range of the paraffin, the clamping jaw when engaging the paraffin coated outside of the packaging material will melt the paraffin layer and partly squeeze it away from the contact zone. Part of the paraffin layer will, however, through the action of the clamping jaw pressure and temperature blend with the polyolefine layer in the boundary area between same and the paraffin layer. This will modify the polyolefine material in such area into a "hot melt" material with properties different from those of both the polyolefine material and the paraffin. Thus, the viscosity properties of the paraffin layer in the just-mentioned boundary area will change to an extent such as to eliminate the sticking of the polyolefine material to the clamping jaw working surface "lubricated" by the paraffin.

The "lubrication" of the heated working surface effected by the paraffin layer has certainly proven to facilitate the release of the packaging material from the working surface in question when removing said surface from the packaging material after a complete working stroke. However, in itself it is not sufficient to prevent the polyolefine material from offsetting onto the working surface. This may easily be proven by letting the working surface of the clamping jaw engage a packaging material of the nature in question but having no paraffin layer in the intended contact zones, the conditions otherwise being equal, and immediately before engaging the polyolefine surface applying paraffin directly to said working surface. In this case a deposit of polyolefine material will appear on the lubricated clamping jaw surface, and this may be explained by the fact that the difference in viscosity between the paraffin and the unblended polyolefine material is too large to make the paraffin lubrication prevent sticking and offset.

Thus, for the objects of the invention it is important not only that the heated working surface be given a release-facilitating lubrication but also that the working surface in question shall not engage an exposed polyolefine surface but rather a surface comprising a blend of the polyolefine material and the paraffin and having more favourable tack and offset properties. The less sharp the transition between the paraffin and polyolefine layers with respect to proporties such as amorphity, crystalinity, viscosity and melting temperature the better the result intended. It is therefore essential that the paraffin layer already when being applied to the polyolefine layer shall blend therewith to a certain depth thereof. If so, the paraffin layer as such will have a firmer adherence to the polyolefine layer and will not be squeezed away entirely by the heated clamping jaw surface, and, in addition, between the two layers there will result a boundary region having, as compared to the pure polyolefine layer, more favourable properties, as regards tackiness and offset. This fact explains why when applying the paraffin to the polyolefine surface a higher than usual temperature is preferred.

In order further to illustrate the practical aspects of the invention there are given below some data relating to an embodiment of the above described packaging method:

In this case the packaging material comprised a paper body having a basis weight of about 180 grams/sq.m., i.e. a thickness of about .2 mm. To that paper face corresponding to the inside of the intended package there was applied a polyethylene layer of a thickness of about .05 mm. The opposite face had a polyethylene layer of a thickness of about .012 mm. The thickness of the paraffin film applied on top of the last mentioned polyethylene film was also about .012 mm.

The working temperature of the working surface of the clamping jaw was of the order of 150–200° C. and the working pressure was in the order of 50 kilograms/sq.m. and was maintained for a period of time of about 1 second.

We claim:

1. A method of treating packaging material having at least a surface layer of polyethylene which comprises coating said surface layer with molten paraffin wax having a melting temperature substantially within the melting point range of said polyethylene, cooling said coated surface to solidify said molten paraffin wax, pressing a solid surface heated to a temperature above the melting point range of said polyethylene against said coated surface and then while still hot separating said solid surface from said coated surface, the thickness of said coating of paraffin, the temperature of said solid surface, the time of contact between said solid surface and said coated surface and the pressure between said solid surface and said coated surface being so adjusted that said coated surface does not adhere and offset to said solid surface.

2. A method as defined in claim 1 in which the weight of the paraffin wax coating is substantially equal to the weight of the polyethylene layer, the temperature of the solid surface is 150–200° C., the pressure of the solid surface on the coated surface is about 50 kg./sq.m. and the time of contact between said solid surface and said coated surface is about 1 second.

References Cited by the Examiner
UNITED STATES PATENTS

| | | | |
|---|---|---|---|
| 2,609,317 | 9/1952 | Vogt | 117—138.8 |
| 2,631,954 | 3/1953 | Bright | 117—138.8 |
| 2,642,366 | 6/1953 | Rumberger | 117—138.8 |
| 2,702,256 | 2/1955 | Trachet | 117—138.8 X |
| 2,882,184 | 4/1959 | Trachet | 117—138.8 X |
| 2,984,585 | 5/1961 | Sherman | 117—138.8 |

WILLIAM D. MARTIN, *Primary Examiner.*

R. HUSACK, *Assistant Examiner.*